(12) United States Patent
Hammadi et al.

(10) Patent No.: US 11,673,529 B2
(45) Date of Patent: Jun. 13, 2023

(54) VEHICLE SEAT COMPRISING A SAFETY DEVICE

(71) Applicant: Faurecia Sièges d'Automobile, Nanterre (FR)

(72) Inventors: Semir Hammadi, Saulx les Chartreux (FR); Fabrice Camus, Paray Vieille Poste (FR); Roland Faure, Etampes (FR)

(73) Assignee: Faurecia Sièges d'Automobile, Nanterre (FR)

( * ) Notice: Subject to any disclaimer, the term of this patent is extended or adjusted under 35 U.S.C. 154(b) by 24 days.

(21) Appl. No.: 17/325,860

(22) Filed: May 20, 2021

(65) Prior Publication Data
US 2021/0380067 A1    Dec. 9, 2021

(30) Foreign Application Priority Data
May 20, 2020   (FR) ................. FR 20 05292

(51) Int. Cl.
*B60R 22/20*     (2006.01)
(52) U.S. Cl.
CPC .................. *B60R 22/20* (2013.01)
(58) Field of Classification Search
CPC ............ B60R 22/20; B60R 2022/208
See application file for complete search history.

(56) References Cited

U.S. PATENT DOCUMENTS

| | | | |
|---|---|---|---|
| 10,081,330 B2* | 9/2018 | Arnold | B60N 2/688 |
| 10,220,811 B2* | 3/2019 | Murasaki | B60R 22/20 |
| 10,752,203 B2* | 8/2020 | Jaradi | B60R 22/20 |
| 10,882,489 B2* | 1/2021 | Ohno | B60R 22/023 |
| 11,110,887 B2* | 9/2021 | Rosenberg | B60R 22/26 |
| 2003/0030264 A1* | 2/2003 | Motozawa | B60R 22/1952 280/806 |
| 2004/0075313 A1* | 4/2004 | Taoka | B60N 2/2887 297/216.16 |
| 2010/0066116 A1 | 3/2010 | Coenen | |
| 2012/0139324 A1* | 6/2012 | Masutani | B60R 22/1955 297/470 |
| 2020/0062149 A1 | 2/2020 | Sekizuka | |

FOREIGN PATENT DOCUMENTS

| | | |
|---|---|---|
| DE | 3631881 A1 | 4/1988 |
| EP | 1362737 A1 | 11/2003 |
| EP | 3616982 A1 | 3/2020 |
| WO | 2008060144 A1 | 5/2008 |

OTHER PUBLICATIONS

French Search Report corresponding to French Application No. FR 2005292, dated Sep. 30, 2020, 2 pages.

* cited by examiner

*Primary Examiner* — Philip F Gabler
(74) *Attorney, Agent, or Firm* — Reising Ethington P.C.

(57) ABSTRACT

A vehicle seat having at least one buckle for receiving a safety belt on a first lateral side of the seat and an attachment of the end of a pelvic strap of the safety belt on a second lateral side of the seat. The seat includes at least one safety device, each safety device having a first cable connecting the buckle or the attachment of the end of the pelvic strap to a first anchor point, and at least one second cable connecting the buckle or the attachment of the end of the pelvic strap to a second anchor point traction on the second cable resulting in a general movement of the buckle or attachment of the pelvic strap end eliminating the risk of submarining.

12 Claims, 6 Drawing Sheets

VEHICLE SEAT COMPRISING A SAFETY DEVICE

TECHNICAL FIELD

The present invention relates to a vehicle seat comprising a safety device.

BACKGROUND

As known, a vehicle such as a car comprises multiple seats for accommodating occupants. The seats comprise at least a backrest and a seat base.

For the most part, these seats are equipped with seat belts.

The seat belt typically comprises a chest strap and a pelvic strap.

The chest strap extends diagonally across the occupant's torso when the belt is fastened.

The pelvic strap extends substantially perpendicular to the legs of the occupant seated on the seat and above the occupant's thighs.

The seat belt is attached to a belt buckle that is integral with the seat or the floor of the vehicle.

In the event of an impact of the vehicle with an obstacle, the seat belt must keep the occupant against the seat and limit his/her forward projection as much as possible in order to prevent the occupant's head from hitting the dashboard, the windshield or the seat in front of him/her, for example.

To do so, a pretensioner is known to be provided, connected to the belt buckle by means of a cable in order to keep the occupant against the seat.

When an impact force greater than a predetermined force is applied to the vehicle and detected by an accelerometer or impact sensor, the pretensioner is triggered and the cable pulls the belt buckle in a general downward motion, thereby pressing the pelvic strap of the seat belt against the occupant's thighs.

However, if the occupant's backrest is placed in a reclined position, there is a risk, despite the presence of the pretensioner, of submarining. Submarining refers to a seat occupant slipping under the pelvic strap of the seat belt during impact on the vehicle, which reduces the effectiveness of the seat belt during this impact. This reduces the effectiveness of the seat belt on impact. The belt then effectively presses against the occupant's abdomen.

SUMMARY

An object of the present invention is a vehicle seat comprising a seat base extending mainly along a longitudinal direction and perpendicular to an elevation direction, a backrest, at least one seat buckle to receive a seat belt on a first lateral side of the seat and an attachment of the end of a pelvic strap of the seat belt on a second lateral side of the seat opposite the first lateral side, the seat comprising at least one safety device on the first and/or second lateral side of the seat, each safety device having a first cable connecting the buckle or attachment of the end of the pelvic strap to a first anchoring point, wherein traction on the first cable of the respective safety device results in a general movement of the buckle and/or attachment of the end of the pelvic strap towards the bottom of the seat, characterized in that each safety device comprises at least a second cable connecting the buckle or attachment of the end of the pelvic strap to a second anchor point separate from the first anchor point, and in that traction on the second cable of the respective safety device results in a general movement of the buckle and/or attachment of the pelvic strap eliminating the risk of submarining.

When the backrest is in the reclined position, the buckle can first move forward, thanks to the first belt buckle anchor point and the first cable, driving the seat belt forward, and then downward, thanks to the second belt buckle anchor point and the second cable. This sequential movement pulls the pelvic strap of the seat belt toward the occupant's thighs, preventing the occupant from slipping under the pelvic strap.

The risk of submarining when the backrest is in the reclined position is thus eliminated.

According to particular embodiments of the invention, the seat may comprise any one or more of the following features, taken alone or in any technically possible combination:

traction on the second cable of the respective safety device results in a general movement of the buckle or attachment of the end of the pelvic strap towards the front of the seat;

for each safety device, the second anchoring point is placed at a higher height in the elevation direction and in front of the seat along the longitudinal direction with respect to the first anchoring point, the second cable extending at a height greater than the height of the first cable along the elevation direction;

the first cable and the second cable of the respective safety device are connected to the buckle or to the attachment of the end of the pelvic strap by a pivot link;

the backrest is rotatable relative to the seat about the axis between a raised position, in which the seat is suitable for receiving a seated occupant in an upright position, and at least one reclined position, in which the seat is suitable for receiving an occupant in a semi-recumbent or recumbent position, and when the backrest is in a raised position, the buckle and/or the attachment of the end of the pelvic strap moves by traction on the first cable of the respective safety device from a rest position, under normal usage conditions of the vehicle, to an impact position, when an impact force greater than a predetermined force is applied to the vehicle, the impact position being at a lower height taken in the direction of elevation than the height of the rest position;

the backrest is rotatable relative to the seat about the axis between a raised position, in which the seat is adapted to receive a seated occupant in an upright position, and at least one reclined position, in which the seat is adapted to receive an occupant in a semi-recumbent or recumbent position, and, when the backrest is in the reclined position, the buckle and/or the attachment of the end of the pelvic strap moves by traction on the second cable of the respective safety device from a resting position, under normal usage conditions of the vehicle, to a first impact position, when an impact force greater than a predetermined force is applied to the vehicle, the first impact position being at a distance from a front edge of the seat base less than the distance between the rest position and the front edge of the seat base, and then by traction on the first cable of the respective safety device, from the first impact position to a second impact position, the second impact position being at a lower height taken in the direction of elevation than the height of the first impact position;

the first cable and the second cable of the respective safety device are connected to the buckle and/or to the attachment of the end of the pelvic strap by a pivot link, the pivot link having a projection complementary to a groove of the seat, the pivot link extending adjacent a first end of the groove under normal usage conditions of the vehicle and the groove having a second end located at a height less than the height of the first end in the elevation direction, and located rearwardly of the second anchor point in the longitudinal direction, and wherein the pivot link moves along the groove toward the second end of the groove when an impact force greater than a predetermined force is applied to the vehicle;

each safety device comprises a first pretensioner linked to a first end of the first cable, configured to activate when an impact force greater than a predetermined force is applied to the vehicle, and to apply traction force to the first cable of the respective safety device resulting in a general movement of the buckle and/or attachment of the end of the pelvic strap towards the bottom of the seat and each safety device comprises a second pretensioner linked to a first end of the second cable of the respective safety device, configured to trigger when an impact force greater than a predetermined force is applied to the vehicle, and to apply traction force to the second cable resulting in a general movement of the buckle and/or attachment of the end of the pelvic strap towards the front of the seat;

the seat comprises at least one electronic control unit configured to determine the which cable or cables to exert traction force on when an impact force greater than a predetermined force is applied to the vehicle;

the first cable has a length between 80 mm and 100 mm, and the second cable has a length between 90 mm and 120 mm.

The invention also relates to a vehicle comprising at least one seat according to the invention.

BRIEF DESCRIPTION OF THE DRAWINGS

The invention will be better understood from the following description, given only by way of example and made with reference to the drawings in which.

DETAILED DESCRIPTION

In the following description, the elevation direction Z is defined according to the height of a vehicle. This direction of elevation Z is, for example, vertical when the vehicle is on level ground.

The terms "top" and "bottom" define directions upward or downward of the vehicle, respectively, along the elevation direction Z under normal vehicle operating conditions.

The longitudinal direction X is defined according to the length of the vehicle. This longitudinal direction X is, for example, horizontal when the vehicle is on level ground and extends in the usual direction of travel of the vehicle. The terms "front" and "rear" define directions towards the front of the seat or the rear of the seat respectively, according to the longitudinal direction X and under normal seat usage conditions.

The transverse direction Y is defined according to the width of the vehicle. This transverse direction Y is, for example, horizontal when the vehicle rests on a horizontal ground and is orthogonal to the longitudinal direction X.

Normal seat usage conditions are conditions in which the vehicle in which the seat is located is used in a conventional manner and has not been subjected to impact, that is, in which, for example, an accelerometer integrated into the vehicle has not detected an impact force greater than a predetermined force applied to the vehicle. In other words, the normal usage conditions correspond to the conditions in which the seat is used outside of an accident phase.

Figure 1:
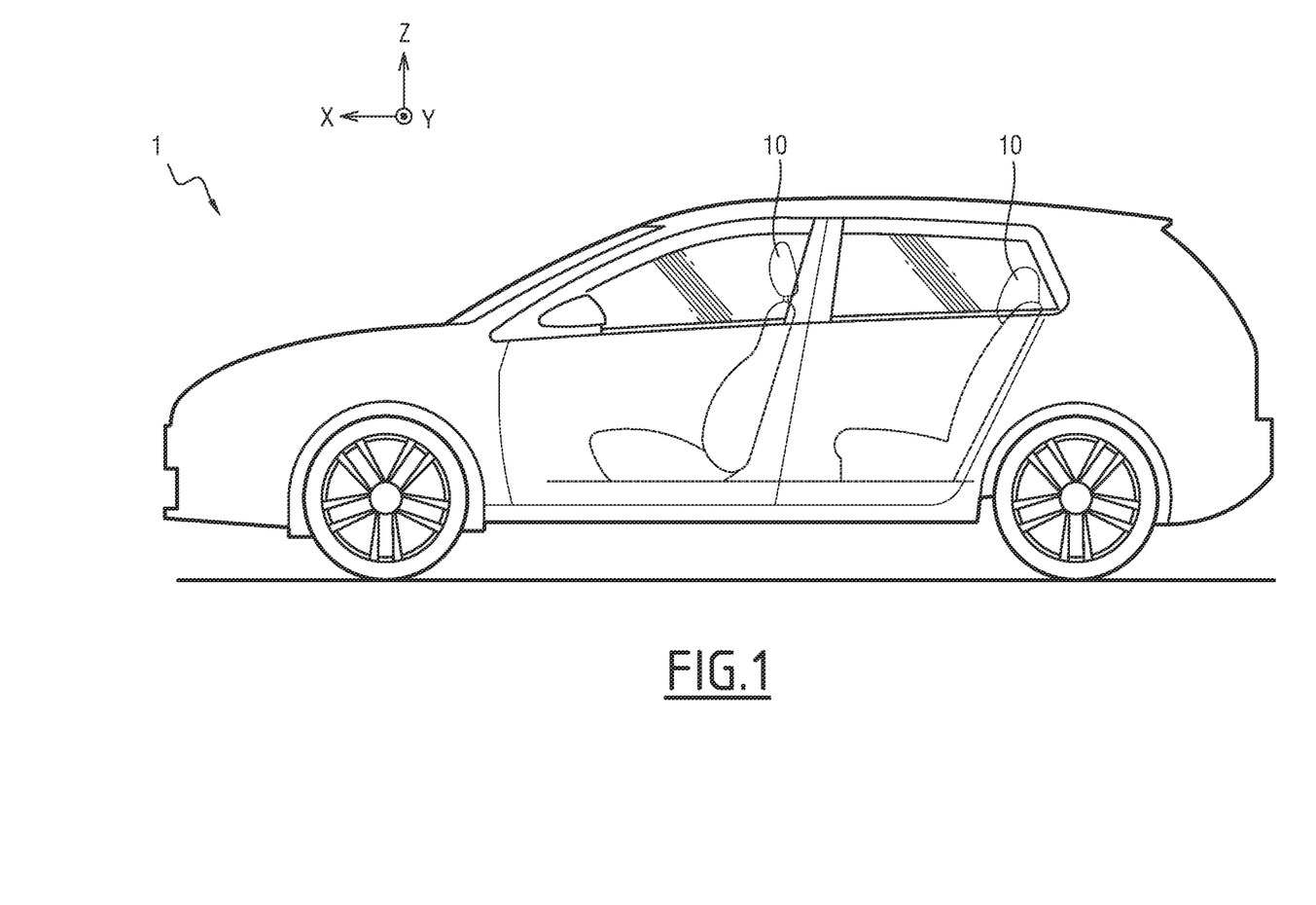
FIG. 1 schematically represents a vehicle comprising multiple seats according to one or more embodiments of the invention, FIG. 2 schematically represents a seat according to one embodiment of the invention accommodating an occupant.

A vehicle 1 is shown in FIG. 1.

The vehicle 1 comprises at least one seat 10. For example, the vehicle comprises multiple seats 10, comprising two seats 10 in the front and three seats 10 or a bench seat in the rear.

Hereinafter, the focus is on the description of one seat 10, the invention being applicable to each seat 10 of the vehicle 1.

The seat 10 is, for example, intended to be mounted in a motor vehicle or in any other type of vehicle, such as a railroad vehicle, a marine vehicle or the like.

Figure 2:
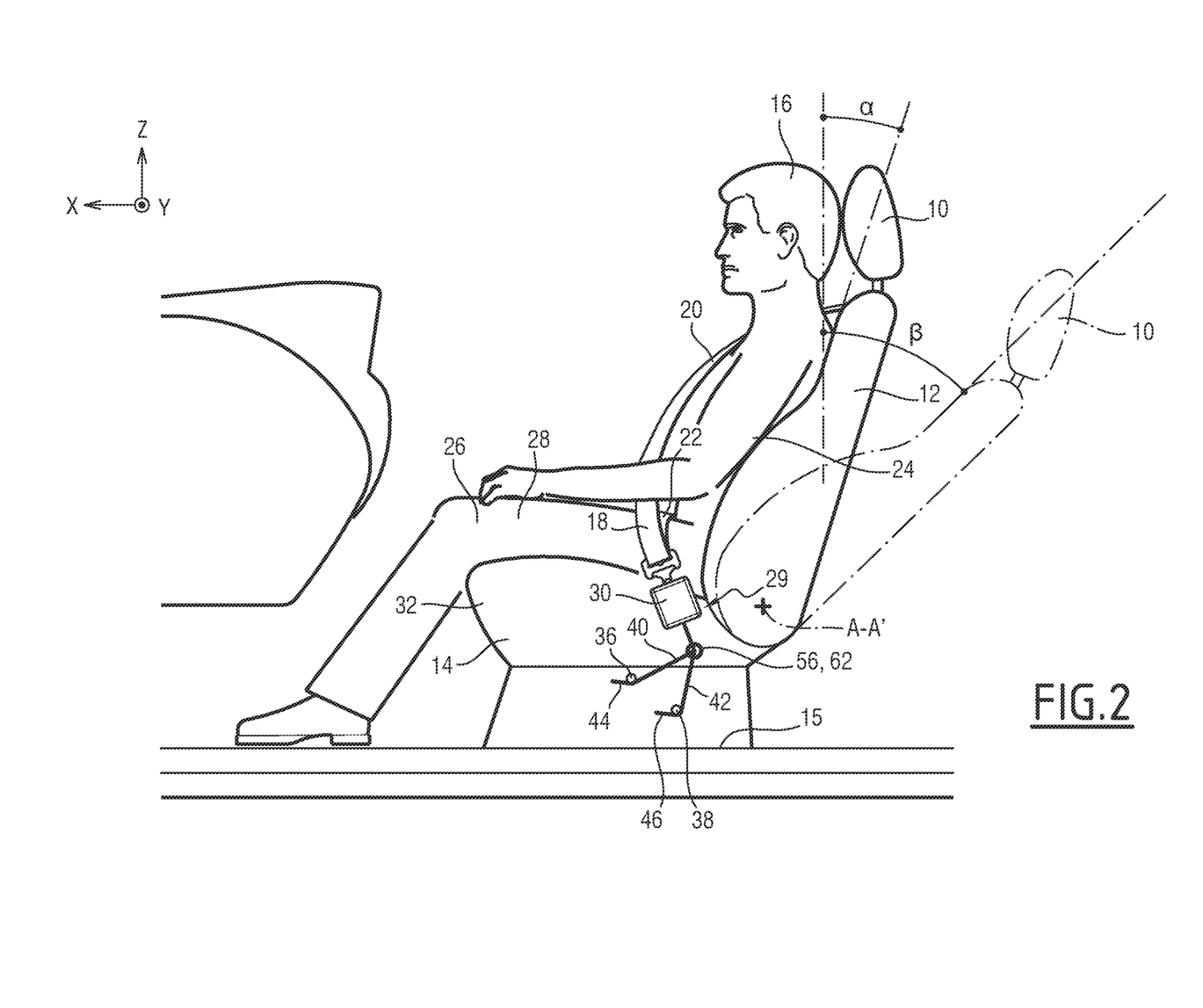

As can be seen in FIG. 2, the seat 10 comprises a backrest 12 and a seat base 14.

The seat base 14 is conventional and will not be described further here.

The backrest 12 is rotatably mounted relative to the seat base 14 about an axis A-A' between a raised position (visible in FIGS. 1 and 2), in which the backrest forms a first angle α with the elevation direction Z, and at least one reclined position (visible in FIG. 2), in which the backrest forms a second angle β with the elevation direction Z, the second angle β being greater than the first angle α.

The first and second angles α and β are such that the seat base 14 and the backrest 12 define an obtuse angle between them, i.e., an angle equal to or greater than 90°.

The first angle α is between 15° and 25°, for example.

The second angle β is greater than the first angle α and is between 25° and 50°, for example. In other words, the backrest 12 is further away from the elevation direction Z in the reclined position than in the raised position.

In the raised position of the backrest 12, the seat 10 is adapted to receive an occupant 16 in an upright position.

Thus, in the raised position, the occupant 16 of the seat 10 is seated in the upright position, in which the occupant 16 faces the windshield, for example, and can observe the environment outside the vehicle 1.

According to one embodiment, the occupant of the seat 10 may place the backrest 12 in multiple reclined positions. The reclined position is, for example, a position also referred to as the relax position, in which the occupant 16 of the seat 10 can relax. In the reclined position, the seat 10 is thus capable of accommodating an occupant 16 in a semi-recumbent or recumbent position. In particular, in an extreme reclined position of the backrest 12, the occupant of the seat 10 is seated in a reclined position, in which the occupant can relax as if using a berth.

For any type of vehicle 1, a seat occupant 10 who is not the driver of said vehicle 1 can adjust his/her seat 10 to the raised position or the reclined position as desired. In the context of an autonomous vehicle, in which the intervention of a driver is limited or non-existent, the raised position corresponds, for example, to a manual driving configuration for a driver's seat 10, and the reclined position corresponds, for example, to an automatic driving configuration, not requiring any driver intervention.

The seat 10 is for example attached to the vehicle 1 by a rail 15.

The seat 10 includes a seat belt 18.

The seat belt 18 is typically wound on a retractor attached to an inner wall of the vehicle 1 or to the seat 10.

In FIG. 2, the seat belt 18 is fastened.

The seat belt 18 comprises, for example, a chest strap 20 and a pelvic strap 22.

When the seat belt 18 is fastened and under normal usage conditions of the vehicle 1, the chest strap 20 extends diagonally along the torso 24 of the occupant 16 and the pelvic strap 22 extends substantially perpendicular to the legs 26 of the occupant 16 seated on the seat 10 and above the thighs 28 of the occupant 16.

In a variant, the seat belt 18 only comprises a pelvic strap 22.

The seat 10 comprises at least one safety device 29.

The seat 10 comprises a belt buckle 30 integral with the seat 10.

The buckle 30 is positioned on a first lateral side 32 of the seat 10.

The buckle 30 ensures the attachment of the belt 18 to the belt 18 passage between the chest strap 20 and the pelvic strap 22.

The buckle 30 is suitable for receiving the seat belt 18 so as to attach the belt 18 and keep the occupant 16 in the seat 10, as shown in FIG. 2.

The buckle 30 is, for example, attached to the seat base 14 or the rail 15.

The seat 10 comprises an attachment 30 of the end of the pelvic strap 22 to the vehicle 1 on a second lateral side of the seat opposite the first lateral side 32 of the seat 10.

For example, the safety device 29 is located on the first lateral side 32 of the seat 10 or on the second lateral side of the seat 10.

Preferably, the safety device 29 is placed on the lateral side 32 of the seat 10 where the buckle 30 is attached.

In a particular embodiment, the seat 10 includes a safety device 29 on both lateral sides of the seat 10.

In FIGS. 3 through 6, the safety device 29 shown corresponds to either the safety device 29 positioned on the first lateral side 32 or the second lateral side of the seat 10.

Thus, the buckle 30 and the attachment 30 of the end of the pelvic strap 22 to the vehicle 1 are shown schematically in the same way.

The description below applies equally to the safety device 29 positioned on the first lateral side 32 or the second lateral side of the seat 10.

Figure 3:
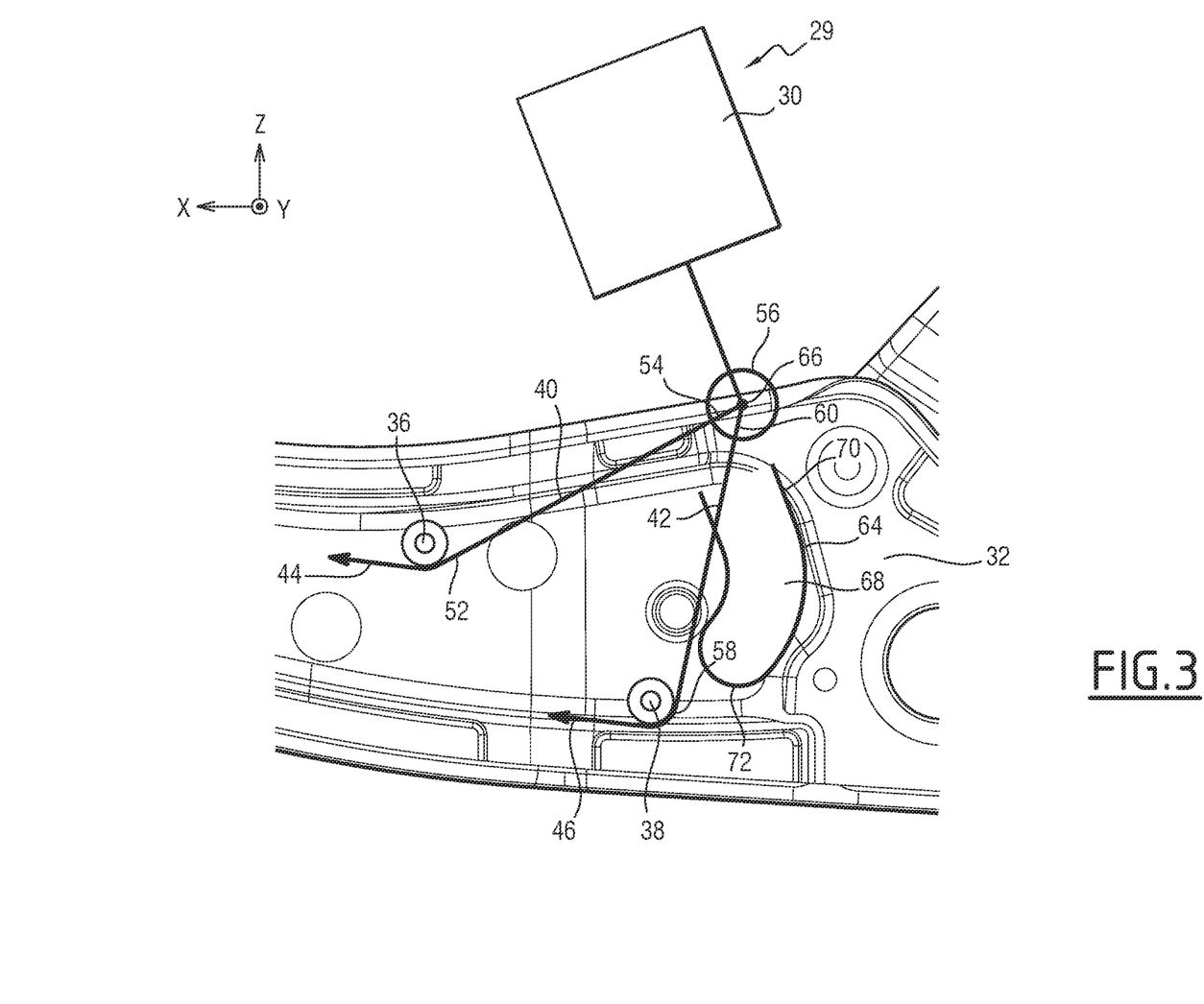
FIG. 3 shows a detail of the seat in FIG. 2 at the safety device level.

As can be seen in FIG. 3, the safety device 29 comprises at least a first anchoring point 38 and a second anchoring point 36 of the buckle 30 on the first lateral side 32 of the seat 10, respectively, of the attachment 30 of the end of the pelvic strap 22 on the second lateral side of the seat 10.

The first anchoring point 38 and the second anchoring point 36 allow the buckle 30 or the attachment 30 of the end of the pelvic strap 22 of the respective safety device 29 to be held integral with the seat 10 under all circumstances and to move the buckle 30 or the attachment 30 of the end of the pelvic strap 22 around the first anchoring point 38 and the second anchoring point 36 when an impact force greater than a predetermined force is applied to the vehicle 1, as will be explained below.

Preferably, the second anchor point 36 is positioned at a higher height along the elevation direction Z and further forward than the first anchor point 38 along the longitudinal direction X.

For example, the second anchor point 36 is at least 60 mm away from the first anchor point 38 when projected along the longitudinal direction X.

For example, the second anchor point 36 is a minimum distance of 40 mm from the first anchor point 38 taken in projection along an elevation direction Z perpendicular to the longitudinal direction X.

The buckle 30 or the attachment 30 of the end of the pelvic strap 22 is connected to the first anchor point 38 of the respective safety device 29 by a first cable 42.

For example, the first cable 42 has a length of between 80 mm and 100 mm.

The first cable 42 extends in a plane comprising longitudinal X and elevation Z directions.

The buckle 30 or the attachment 30 of the end of the pelvic strap 22 is connected to the second anchor point 36 of the respective safety device 29 by a second cable 40.

For example, the second cable 40 has a length of between 90 mm and 120 mm.

The second cable 40 extends in a plane comprising longitudinal X and elevation Z directions.

The first cable 42 and the second cable 40 of the respective safety device 29 are movable about the first anchor point 38 and the second anchor point 36 respectively, which each form a pulley link.

Thus, traction on the second cable 40 results in a general forward movement of the buckle 30 or attachment 30 of the pelvic strap 22 of the respective safety device 29 toward the front of the seat 10 when the backrest 12 is in a reclined position, and traction on the first cable 42 results in a general downward movement of the buckle 30 or attachment 30 of the pelvic strap 22 of the respective safety device 29 toward the bottom of the seat 10 when the backrest 12 is in a raised or reclined position. "General forward movement" means a movement resulting in a reduction of the distance measured along the longitudinal direction X between the buckle 30 or attachment 30 of the end of the pelvic strap 22 and a front edge 43 of the seat base 14, but not necessarily aligned with this longitudinal direction X.

"General downward movement" means a movement resulting in a reduction in the distance measured along the elevation direction Z between the buckle 30 or attachment 30 of the end of the pelvic strap 22 and the rail 15 to which the seat 10 is attached, but not necessarily aligned with the elevation direction Z.

To do so, the first cable 42 has a first end 58 connected to a first pretensioner 46 configured to activate when an impact force greater than a predetermined force is applied to the vehicle 1, and to apply traction force to the first cable 42 to move the buckle 30 or the attachment 30 of the end of the pelvic strap 22 of the respective safety device 29 towards the bottom of the seat 10 along the elevation direction Z.

The second cable 40 has a first end 52 connected to a second pretensioner 44 configured to activate when an impact force greater than a predetermined force is applied to the vehicle 1, and to apply traction force to the second cable 40 to move the buckle 30 or the attachment 30 of the end of the pelvic strap 22 of the respective safety device 29 forward of the seat 10 along the longitudinal direction X.

The impact force is a force greater than a predetermined force. This impact force results from an impact detected by accelerometers and/or impact sensors in the vehicle In particular, the seat 10 comprises an electronic control unit (not shown) configured to determine the cable(s) 40, 42 on which to exert traction force, based on the position of the seat 10, as will be described in more detail later.

The first cable 42 comprises a second end 60 linked to the pivot link 56 integral with the buckle 30 or the attachment of the end of the pelvic strap 22.

In the pivot link 56, the second end 60 of the first cable 42 is rotatable relative to the buckle 30 or the attachment of the end of the pelvic strap 22 about an axis parallel to the transverse direction Y.

The second cable 40 comprises a second end 54 connected to the pivot link 56, integral with the buckle 30 or the attachment 30 of the end of the pelvic strap 22 of the respective safety device 29.

In the pivot link 56, the second end 54 of the second cable 40 is rotatable relative to the buckle 30 or the attachment 30 of the end of the pelvic strap 22 of the respective safety device 29 about an axis parallel to the transverse direction Y.

For example, the pivot link 56 comprises a projection 66 complementary to a groove 68 of the seat 10, the groove 68 extending between a first end 70 in the vicinity of the pivot link 56 under normal vehicle usage conditions and a second end 72 located at a height lower than the height of the first end 70 along the elevation direction Z, and located behind the first anchoring point 38 along the longitudinal direction X.

The groove 68 forms an arc of a circle, for example.

The link 64 formed by the projection 66 and the groove 68 prevents the second cable 40 from twisting and buckling when the buckle 30 is pulled or the end of the pelvic strap 22 is attached in a general downward movement by taking up the force that the occupant 16 exerts on the belt 18.

Figure 4:
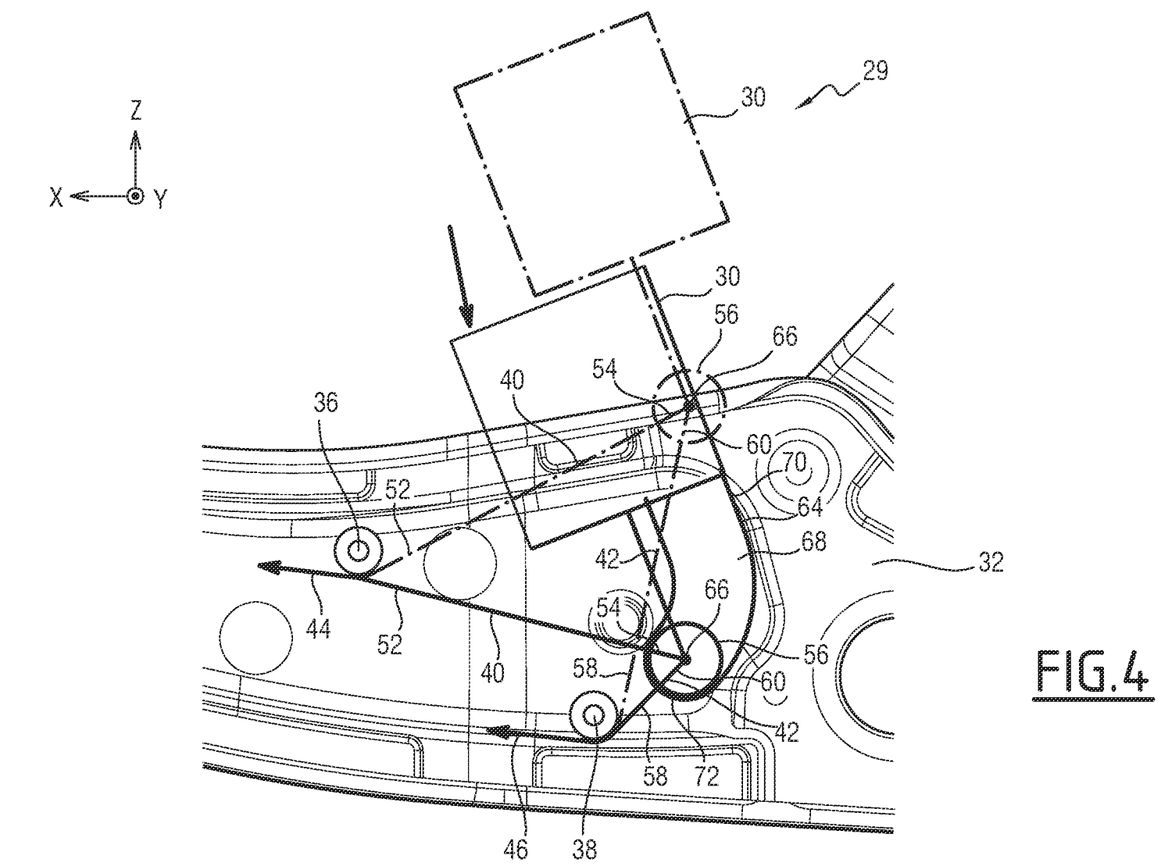
FIG. 4 shows the safety device of FIG. 3 in a rest position (dotted lines) and an impact position (solid lines) when the backrest is in a raised position.

When the backrest 12 is in the raised position, the buckle 30 or end attachment of the pelvic strap 22 is translatable between a rest position under normal vehicle usage conditions and an impact position when an impact force greater than a predetermined force is applied to the vehicle 1, as shown in FIG. 4.

For example, the electronic control unit determines the cable 40, 42 on which to apply traction force, and, when the backrest 12 is in the raised position and when an impact force greater than a predetermined force is applied to the vehicle 1, it initiates the application of traction force to the second cable 42.

For example, this traction force is exerted by the first pretensioner 46 connected to the first end 58 of the first cable 42. The second pretensioner 44, connected to the first end 52 of the second cable 40, is not triggered.

The second ends 54, 60 of the first cable 42 and the second cable 40, connected to the pivot link 56, are driven upon impact while the first end 52 of the second cable 40 is held in place.

For example, the pivot link 56 of the buckle 30 or end attachment of the pelvic strap 22 in the rest position is at a height greater than the height of the link 64 along the elevation direction Z, and when an impact force greater than a predetermined force is applied to the vehicle 1, the pivot link 56 moves along the direction D of the link 68 formed by the groove 68 and the projection 66 so that the pivot link 56 is at a lower height as measured along the elevation direction Z after the movement.

The first anchor point 38 and the second anchor point 36 are integral with the seat 10 and do not move upon impact.

The seat belt 18 is thus pressed against the thighs 28 of the occupant 16.

Figure 5:
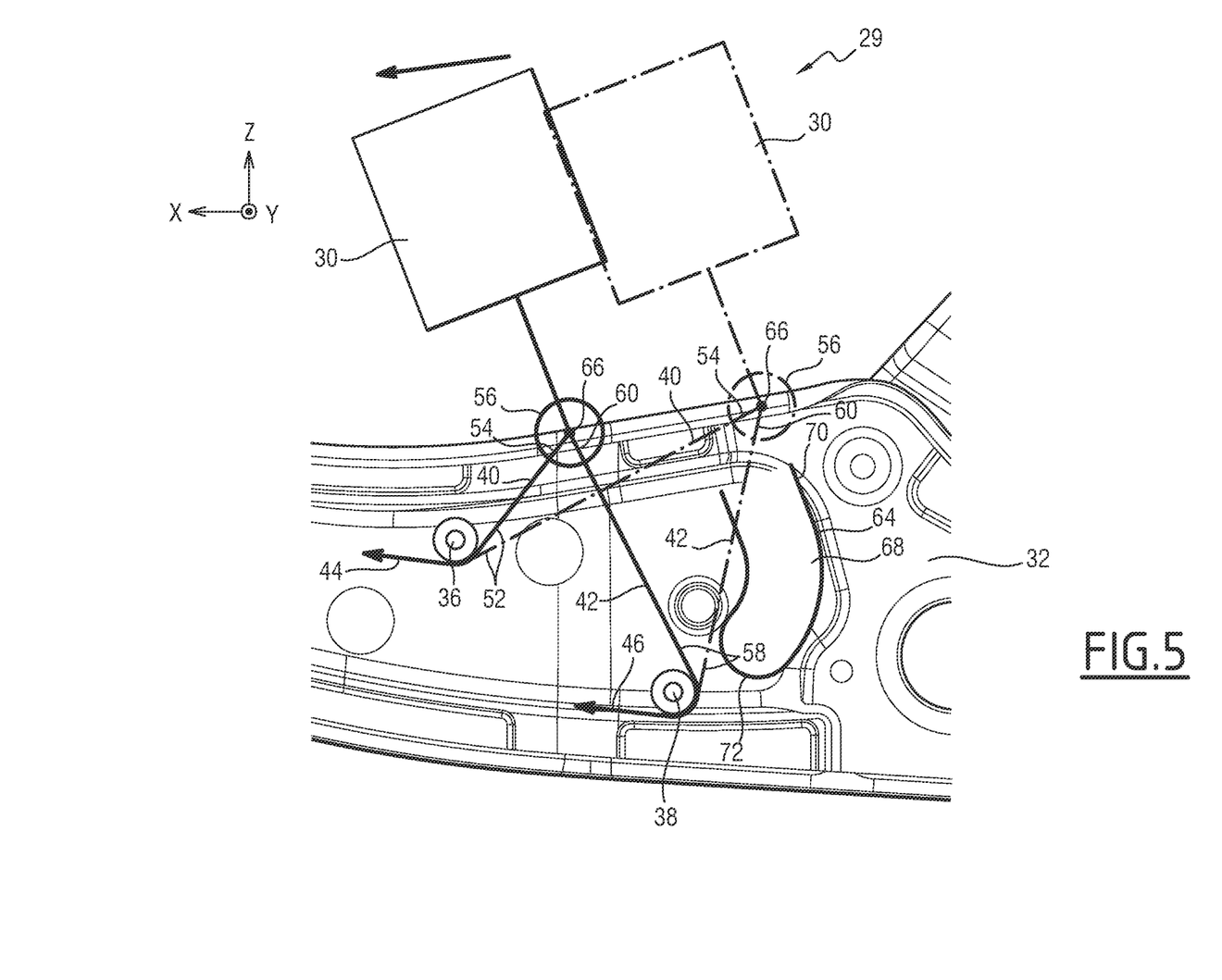
FIG. 5 shows the safety device of FIG. 3 in a rest position (dotted lines) and in a first impact position (solid lines) when the backrest is in a reclined position, and FIG. 6 schematically represents the seat belt buckle of FIG. 3 in the first impact position (dashed lines) and in a second impact position (solid lines) when the backrest is in a reclined position.

When the backrest 12 is in the reclined position, the buckle 30 or end attachment of the pelvic strap 22 is movable between a resting position under normal vehicle usage conditions and a first impact position when a force greater than a predetermined force is applied to the vehicle 1, as shown in FIG. 5.

For example, the electronic control unit determines the cable 40, 42 on which to apply traction force, and, when the backrest 12 is in a reclined position and an impact force greater than a predetermined force is applied to the vehicle 1, the electronic control unit initiates the application of traction force first to the second cable 40.

For example, this traction force is applied by the second pretensioner 44 connected to the first end 52 of the second cable 40. The first pretensioner 46 connected to the first end 58 of the first cable 42 is not triggered.

The second ends 60, 54 of the first cable 42 and the second cable 40, connected to the pivot link 56 respectively, are driven upon impact while the second end 58 of the first cable 42 is held in place.

The first impact position of the buckle 30 or of the attachment 30 of the end of the pelvic strap 22 is thus at a reduced distance measured along X between the buckle 30 and the front edge 43 of the seat base 14 or between the attachment 30 of the end of the pelvic strap 22 and the front edge 43 of the seat base 14.

The first anchor point 38 and the second anchor point 36 are integral with the seat 10 and do not move upon impact.

Figure 6:
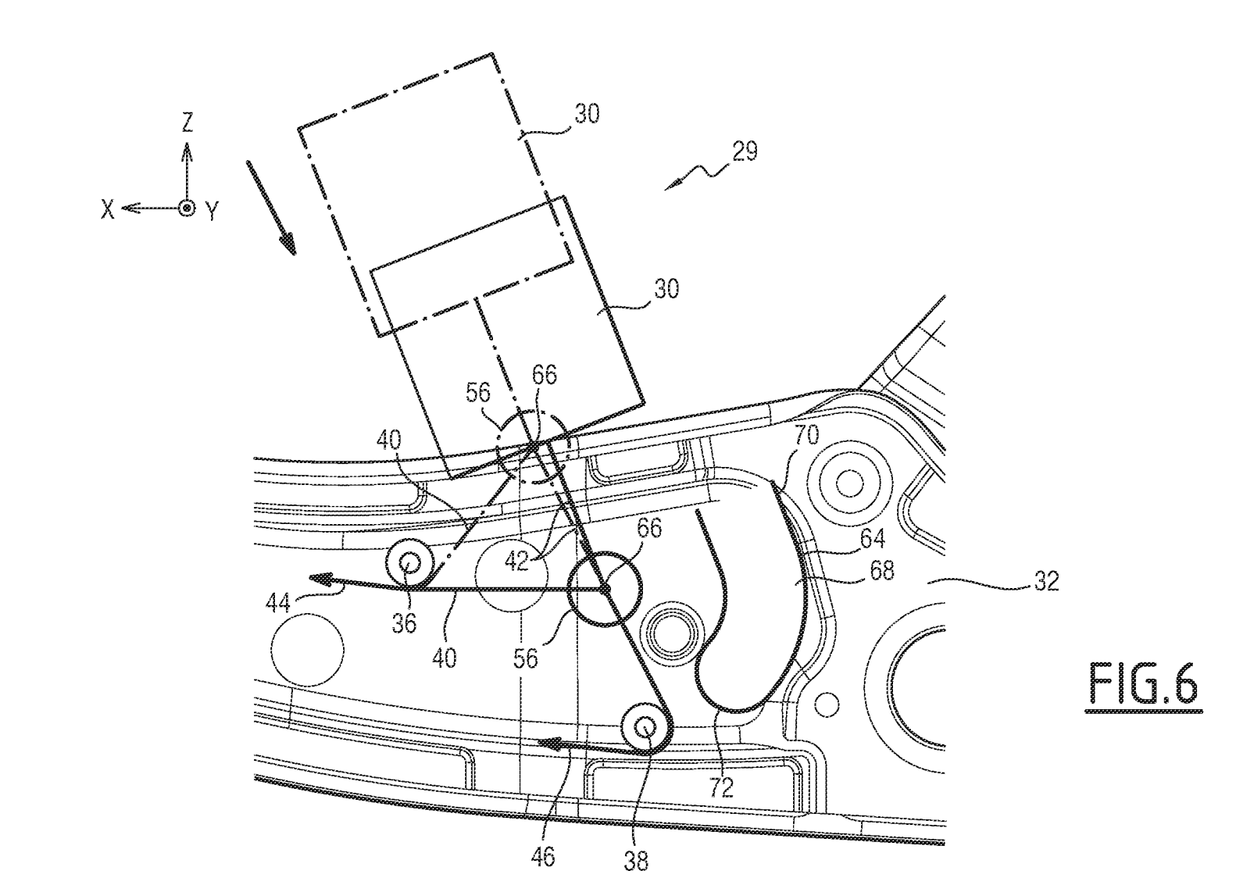

Then, in a second step, from the first impact position, the buckle 30 or attachment 30 of the end of the pelvic strap 22 is movable to a second impact position, toward the second anchor point 36, as shown in FIG. 6.

For example, the electronic control unit determines which cable 40, 42 to apply traction force to, and when the backrest 12 is in the reclined position and the buckle 30 or the attachment 30 of the end of the pelvic strap 22 is in the first impact position, it initiates the application of traction force to the first cable 42.

For example, this traction force is exerted by the first pretensioner 46 connected to the first end 58 of the first cable 42.

The second ends 60, 54 of the first cable 42 and the second cable 40, connected to the pivot link 56, are driven in the second impact time while the first end 52 of the second cable 40 respectively connected to the first anchor point 38 is held in place.

For example, the pivot link 56 of the buckle 30 or the attachment 30 of the end of the pelvic strap 22 in the first impact position is at a height greater than the height of the pivot link 56 of the buckle 30 or the attachment 30 of the end of the pelvic strap 22 in the second impact position measured along the elevation direction Z, and the application of an impact force greater than a predetermined force is applied to the vehicle 1 results in a general downward movement of the pivot link 56 from the first impact position to the second impact position along the elevation direction Z.

The second impact position of the buckle 30 or the attachment of the end of the pelvic strap 22 is thus at a lower height than the rest position of the buckle 30 or the attachment of the end of the pelvic strap 22 and the first impact position along the elevation direction Z.

The first anchor point 38 and the second anchor point 36 are integral with the seat 10 and do not move upon impact.

In other words, the application of an impact force greater than a predetermined force on the vehicle 1 when the backrest 12 is in the reclined position, results in a general sequential movement of the buckle 30 and/or the attachment 30 of the end of the pelvic strap 22, and thus the effective anchor point of the seatbelt 18, forward and then downward while the seatbelt 18 is pressed against the thighs 28 of the occupant 16.

The sequential forward and then downward movement instead of just downward movement ensures that the pelvic strap 22 of the seat belt 18 is on the thighs 28 of the occupant 16 and not on his/her abdomen.

This eliminates the risk of submarining by avoiding compression of the abdomen of the occupant 16 as he/she is projected forward.

The position of the anchor points 36, 38 and the length of the cables 40, 42 determine the trajectory and the final position of the buckle 30 or the attachment 30 of the end of the pelvic strap 22 and thus the effective anchoring point of the safety belt 18.

With the invention, the effective seat belt anchorage point is in a correct position when the backrest is in a reclined position only when an impact force greater than a predetermined force is applied to the vehicle. There is no need to develop an actuation system that moves the seat belt anchorage point at all times when the backrest is in the reclined position. A saving in mass and cost is thus achieved.

The above description is made for a seat facing the front of the vehicle. The directions must be adapted accordingly when the seat is rotated along another direction of the vehicle.

According to one variant, the seat comprises a single pretensioner for moving the buckle or attachment of the pelvic strap forward in the first impact position when the backrest is in the reclined position and two pretensioners for moving the buckle or attachment of the pelvic strap downward in the second impact position.

According to another variant, the seat has more anchor points. This enables the position of the seat belt during impact to be refined.

The invention claimed is:

1. A vehicle seat comprising a seat base having at least a portion extending along a longitudinal direction and perpendicular to an elevation direction, a backrest, at least one buckle for receiving a seat belt on a first lateral side of the seat, and an attachment of the end of a pelvic strap of the seat belt to a second lateral side of the seat opposite the first lateral side, the seat comprising at least one safety device on the first and/or second lateral side of the seat, each safety device having a first cable connecting the buckle or attachment of the end of the pelvic strap to a first anchoring point wherein traction on the first cable of the respective safety device results in a general movement of the buckle and/or attachment of the pelvic strap towards a bottom of the seat, wherein each safety device comprises at least a second cable connecting the buckle or the attachment of the end of the pelvic strap to a second anchor point separate from the first anchor point, and in that traction on the second cable of the respective safety device results in a general movement of the buckle or the attachment of the end of the pelvic strap eliminating the risk of submarining, wherein for each safety device the second anchor point is located at a higher height along the elevation direction and in front of the seat along the longitudinal direction than the first anchor point, the second cable extending at a height greater than the height of the first cable along the elevation direction.

2. The seat according to claim 1, wherein traction on the second cable of the respective safety device results in a general movement of the buckle or attachment of the pelvic strap end toward a front of the seat.

3. The seat according to claim 1, wherein the first cable and the second cable of the respective safety device are connected to the buckle or attachment of the end of the pelvic strap by a pivot link.

4. The seat according to claim 1, wherein the backrest is rotatable relative to the seat base about an axis between a raised position, in which the seat is adapted to receive an occupant seated in an upright position, and at least one reclined position, in which the seat is adapted to receive an occupant in a semi-recumbent or reclined position, and wherein, when the backrest is in a raised position, the buckle and/or the attachment of the end of the pelvic strap moves by traction on the first cable of the respective safety device from a rest position under normal usage conditions of the vehicle to an impact position when an impact force greater than a predetermined force is applied to the vehicle, the impact position being at a lower height taken along the elevation direction than the height of the rest position.

5. The seat according to claim 1, wherein the backrest is rotatable relative to the seat base about an axis between a raised position in which the seat is capable of receiving an occupant seated in an upright position, and at least one reclined position, in which the seat is capable of receiving an occupant in a semi-recumbent or recumbent position, and wherein, when the backrest is in a reclined position, the buckle and/or the attachment of the end of the pelvic strap moves by traction on the second cable of the respective safety device from a resting position under normal usage conditions of the vehicle, to a first impact position when an impact force greater than a predetermined force is applied to the vehicle the first impact position being at a distance from a front edge of the seat base less than the distance between the rest position and the front edge of the seat base, and then by traction the first cable of the respective safety device from the first impact position to a second impact position, the second impact position being at a lower height taken along the elevation direction than the height of the first impact position.

6. The seat according to claim 1, wherein the first cable and the second cable of the respective safety device are connected to the buckle and/or to the attachment of the end of the pelvic strap by a pivot link, the pivot link having a projection complementary to a groove of the seat, the pivot link extending adjacent a first end of the groove under normal usage conditions of the vehicle and the groove having a second end located at a height lower than the height of the first end in the elevation direction, and located rearwardly of the second anchor point in the longitudinal direction, and wherein the pivot link moves along the groove toward the second end of the groove when an impact force greater than a predetermined force is applied to the vehicle.

7. The seat according to claim 1, wherein each safety device comprises a first pretensioner linked to a first end of the first cable, configured to activate when an impact force greater than a predetermined force is applied to the vehicle, and to apply traction force to the first cable of the respective safety device resulting in a general movement of the buckle and/or the attachment of the end of the pelvic strap towards the bottom of the seat and each safety device comprises a second pretensioner linked to a first end of the second cable of the respective safety device, configured to trigger when an impact force greater than a predetermined force is applied to the vehicle, and to apply traction force to the second cable resulting in a general movement of the buckle and/or the attachment of the pelvic strap end towards the front of the seat.

8. The seat according to claim 1, wherein the seat comprises at least one electronic control unit configured to determine which cable or cables to exert traction force on when an impact force greater than a predetermined force is applied to the vehicle.

9. The seat according to claim 1, wherein the first cable has a length of between 80 mm and 100 mm, and the second cable has a length of between 90 mm and 120 mm.

10. A vehicle comprising at least one seat according to claim 1.

11. A vehicle seat comprising a seat base having at least a portion extending along a longitudinal direction and perpendicular to an elevation direction, a backrest, at least one buckle for receiving a seat belt on a first lateral side of the seat, and an attachment of the end of a pelvic strap of the seat belt to a second lateral side of the seat opposite the first lateral side, the seat comprising at least one safety device on the first and/or second lateral side of the seat, each safety device having a first cable connecting the buckle or attachment of the end of the pelvic strap to a first anchoring point wherein traction on the first cable of the respective safety device results in a general movement of the buckle and/or attachment of the pelvic strap towards a bottom of the seat,
  wherein each safety device comprises at least a second cable connecting the buckle or the attachment of the end of the pelvic strap to a second anchor point separate from the first anchor point, and in that traction on the second cable of the respective safety device results in a general movement of the buckle or the attachment of the end of the pelvic strap eliminating the risk of submarining,
  wherein the backrest is rotatable relative to the seat base about an axis between a raised position in which the seat is capable of receiving an occupant seated in an upright position, and at least one reclined position, in which the seat is capable of receiving an occupant in a semi-recumbent or recumbent position,
  and wherein, when the backrest is in a reclined position, the buckle and/or the attachment of the end of the pelvic strap moves by traction on the second cable of the respective safety device from a resting position under normal usage conditions of the vehicle, to a first impact position when an impact force greater than a predetermined force is applied to the vehicle the first impact position being at a distance from a front edge of the seat base less than the distance between the rest position and the front edge of the seat base, and then by traction the first cable of the respective safety device from the first impact position to a second impact position, the second impact position being at a lower height taken along the elevation direction than the height of the first impact position.

12. A vehicle seat comprising a seat base having at least a portion extending along a longitudinal direction and perpendicular to an elevation direction, a backrest, at least one buckle for receiving a seat belt on a first lateral side of the seat, and an attachment of the end of a pelvic strap of the seat belt to a second lateral side of the seat opposite the first lateral side, the seat comprising at least one safety device on the first and/or second lateral side of the seat, each safety device having a first cable connecting the buckle or attachment of the end of the pelvic strap to a first anchoring point wherein traction on the first cable of the respective safety device results in a general movement of the buckle and/or attachment of the pelvic strap towards a bottom of the seat,
  wherein each safety device comprises at least a second cable connecting the buckle or the attachment of the end of the pelvic strap to a second anchor point separate from the first anchor point, and in that traction on the second cable of the respective safety device results in a general movement of the buckle or the attachment of the end of the pelvic strap eliminating the risk of submarining,
  wherein the first cable and the second cable of the respective safety device are connected to the buckle and/or to the attachment of the end of the pelvic strap by a pivot link, the pivot link having a projection complementary to a groove of the seat, the pivot link extending adjacent a first end of the groove under normal usage conditions of the vehicle and the groove having a second end located at a height lower than the height of the first end in the elevation direction, and located rearwardly of the second anchor point in the longitudinal direction, and wherein the pivot link moves along the groove toward the second end of the groove when an impact force greater than a predetermined force is applied to the vehicle.

* * * * *